Oct. 22, 1957  H. N. COTTLE, JR  2,810,869
ONE-PIECE CLAMPING CONSTRUCTION
Filed July 9, 1954  2 Sheets-Sheet 1

Inventor
Harry N. Cottle, Jr.
By his attorneys
Howson and Howson

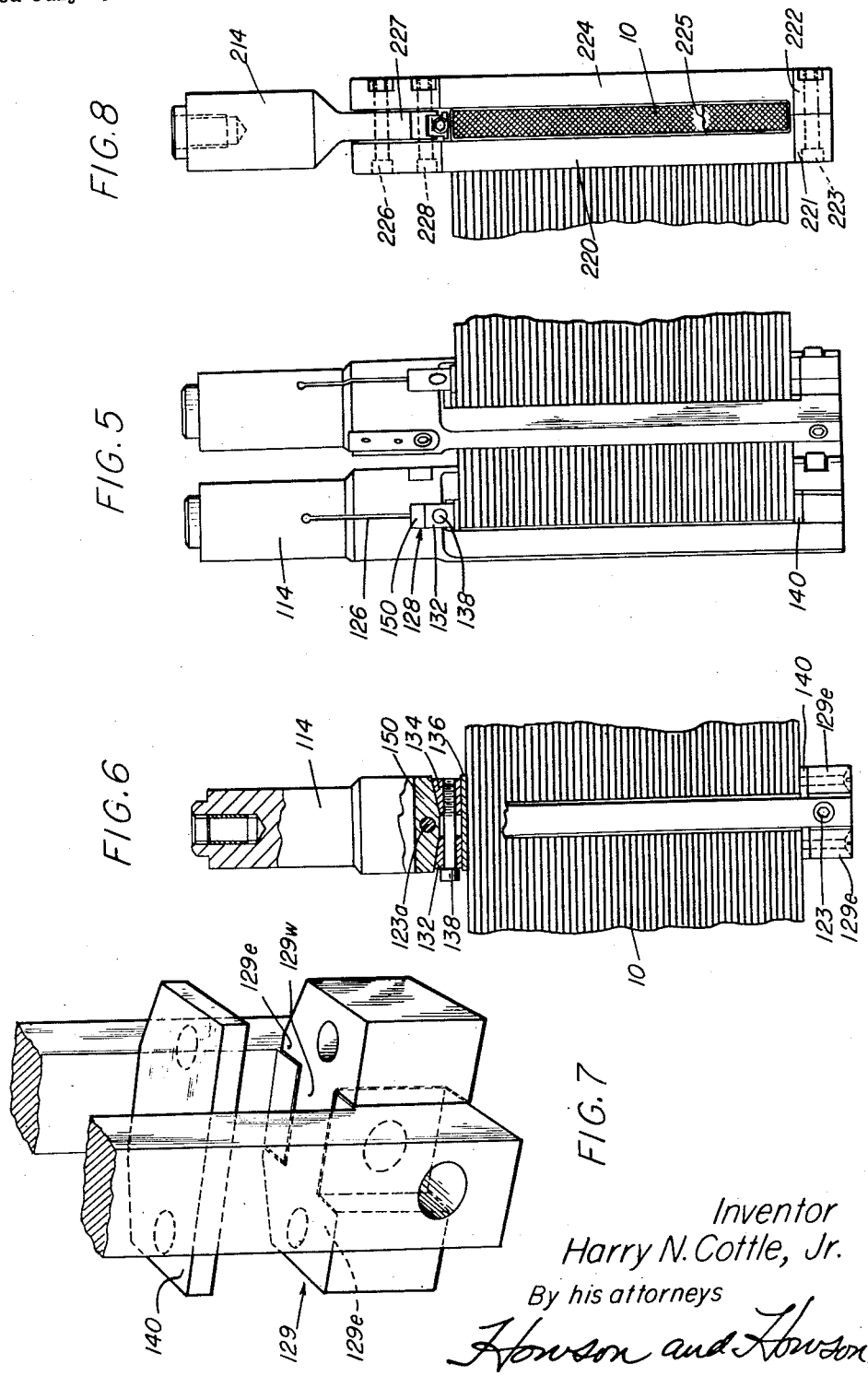

United States Patent Office 2,810,869
Patented Oct. 22, 1957

2,810,869

ONE-PIECE CLAMPING CONSTRUCTION

Harry N. Cottle, Jr., North Haven, Conn., assignor, by mesne assignments, to Textron, Inc., a corporation of Rhode Island Application July 9, 1954, Serial No. 442,273

18 Claims. (Cl. 317—158)

This invention relates to a driver coil assembly for for an electromagnetic vibration exciter and more particularly to an assembly having the necessary stiffness and other qualities required in electromagnetic vibration exciters of large size and high frequency.

Electromagnetic vibration exciters are used to test specimens of mechanisms under vibrations of high frequency obtained by electromagnetic means.

The driving assemblies of such exciters customarily comprise an electromagnetic coil having substantial length and a frame frequently including the table carrying the specimen, which frame overlies one axial end of the coil and is attached to the coil by means of a plurality of legs rigidly depending from the frame and adapted to hold the coil at spaced points around its circumference. This driving unit may sometimes have to oscillate over distances of 1" or more; and frequencies may sometimes go up to about 24,000 cycles per second. When it is realized that the forces generated by the machine may be as much as 10,000 pounds, it will be seen that any vibration relatively between the coil and the table is a serious factor in the operation of the machine.

In large-type vibration exciters it is not practical to have the driver assembly extend through the main body of the stationary part of the machine far enough to have a spider or other bracing means on the opposite side of the main body of the machine from the table which is carrying the specimen. Hence, any rigidity of the legs must be obtained from the table end of the exciter or circumferentially. The axial and radial rigidity and clamping of the coil in my device are all obtained through these independent legs which are fixedly mounted at one end and except for the fact that they all are clamped on the coil, have no other circumferential connection.

For testing an ever-increasing number of things it has become desirable to increase the force generated by electromagnetic vibration exciters. Yet, at the same time, in order to take advantage of the maximum utility of the machine, the operating frequency must also be increased. These two requirements in general are not compatible. Increasing the force requires an increase in size; and an increase in size in general results in a reduction of the natural frequency of the moving element, namely, the driver coil assembly. Since the moving element should be operated at frequencies below the first main structural natural mode frequency of that element in order to avoid resonance, any reduction of the natural frequency of the moving element is a handicap.

It has been determined that a controlling factor in determining the maximum frequency usable with a given force rating is the value of the ratio of Young's modulus to the density of the material used in the driver coil assembly. I have also discovered that even this ratio is a controlling factor only if the joints and geometry of the structure do not increase the requirements of maximum rigidity.

I have found that most engineering materials, including steel, aluminum and magnesium, have a surprisingly close or uniform value for the ratio of Young's modulus to density, and that even where non-conductive material is used the ratio is still the deciding factor in getting the necessary rigidity. It has been found, however, particularly with the larger size of exciters, that even with the proper ratio, driving units of a well-designed construction do not give as much rigidity as could be desired.

Therefore it is an object of this invention to obtain a driver coil assembly for an electromagnetic vibration exciter having the maximum rigidity within itself in both the axial and radial directions with relation to the coil.

Another object is to provide greater rigidity of the driver assembly of a vibration exciter by forming the legs each of a solid single piece of metal or other suitable material.

Another object is to provide means, such as a split on one end of a leg of the aforesaid type, to permit insertion of the coil.

Another object is to provide in a leg of the aforesaid type, tension means pressing on the coil within the periphery of the leg to hold the coil.

Other objects and advantages of the invention will become apparent as it is described in connection with the drawings.

In the drawings:

Fig. 5 is an elevation view of an assembly of two legs and the coil modification of the structure of Figs. 1–4.

Fig. 6 is an elevation view partly broken away and partly in section of the modification of Fig. 5, viewed radially of the coil.

Fig. 7 is a detail perspective view of the parts at the lower end of the clamp of the Fig. 4 modification.

Fig. 8 is a fragmentary elevation view partly in section of the upper portion of another form of a vibration exciter leg, clamp and driver coil assembly viewed radially of the coil.

I have noted that while a vibration exciter or shaker having a generated force of 2 pounds may have a frequency range up to 25,000 cycles per second, and a shaker having a generated force of 25,000 pounds may have a frequency only up to 2,000 cycles per second, a machine having a generated force as high as 10,000 pounds may be called upon to operate in a frequency range anywhere from 0 up to 5,000 cycles per second. To give the maximum rigidity in machines of these largest sizes I use legs, i. e. driver rods, which are of solid, one-piece construction. In order to make a leg out of one solid piece of metal and still hold the coil of flat wire assembled around the circumference of the driver assembly, I split the solid legs so that they may be spread slightly for insertion of the coil.

Figure 1:
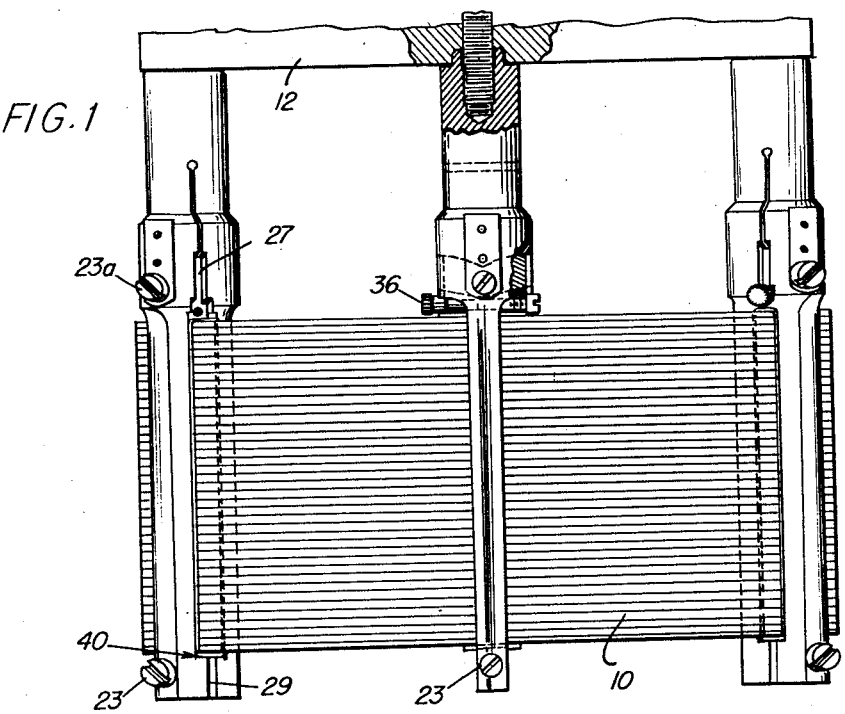
Fig. 1 is a view in elevation of a driver assembly according to my invention for a vibration exciter with the middle leg broken away at two points for clarity.
Figures 2, 3:
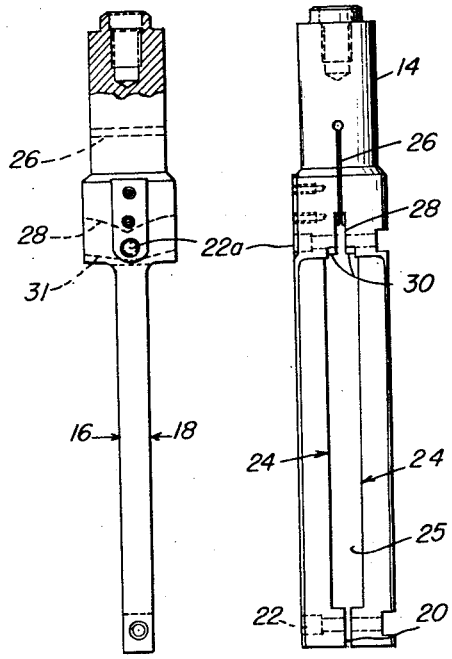
Fig. 2 is a view in elevation of one of the legs of the driver assembly of Fig. 1 as viewed radially.
Fig. 3 is a view in elevation of the leg of Fig. 2 seen at right angles to Fig. 2.

Referring to the drawing, Figs. 1, 2 and 3 illustrate a driver assembly embodying my invention. Three legs and one side of the driver coil of a vibration exciter are shown. The assembly does not project below the driver coil 10 to any great extent. The driver coil 10 is composed of flat wire wound as a helical coil having substantial axial length. Overlying one end of the coil is a frame which may be a table 12 to carry the specimen to be tested. To hold the coil at spaced points a plurality of legs rigidly depend from the table. Each leg is a single, solid piece of metal the upper end of which is bolted to the table. The lower ends of the legs extend only a short distance below the coil. The upper end 14 of each leg may be cylindrical with a tapped axial bore by which the leg may be bolted to the table. From slightly above the middle, the leg is flattened on opposite sides, as is well illustrated in Fig. 2.

Each leg is bifurcated diametrically and perpendicularly to the parallel flat side surfaces 16, 18, to a point above the termination of the flat surfaces. The separation of the bifurcations varies throughout its length to accomplish different functions as will now be explained.

At its lower end, the separation consists of a slot 20, the opposed faces of which can be drawn inward by a screw bolt 23 passing through a transverse bore 22 at that location. A short distance above said lower end, the separation is widened, to accommodate the driver coil 10, by recessing the interior surfaces of the bifurcations upwardly as at 24, a distance at least equal to the height of the driver coil.

From the top of the widened coil receiving recess 25, the separation between the bifurcations narrows in two steps to a final cut 26 which may be a saw cut. The saw cut is continued substantially above the coil recess 25 to enable the bifurcations to be spread, thus to permit insertion of the coil through the slot 20 into the coil recess.

Because the saw cut 26 is not sufficiently accurate in width, the lower end 28 thereof adjacent its juncture with the recess 25 is machined to a desired width and also to provide smooth flat surfaces between which a shim or spacer 27 may be inserted. A transverse bore 22a through the leg at the widened slot 28 receives a screw bolt 23a which can draw the bifurcations together as it is tightened thus to clamp the coil to the leg. Another shim or spacer 29 is inserted in the bottom slot 20 between the bifurcations. By proper determination of thickness of the spacers 27 and 29, the clamping action upon the coil 10 can be limited to the desired amount. In that way the proper amount of lateral or radial clamping action of the legs to the coil can be achieved, the lateral clamping action of all the legs being in radial planes.

In order to exert clamping action on the top and bottom of the coil 10, i. e. axially of the leg, the shoulders 30, where the sides of the widened slot 28 join the coil-receiving recess 25, are machined to incline outwardly and upwardly from the medial plane passing through the bifurcations. Sliding on the thus-formed inclined surfaces 31, 33 are oppositely facing wedge members 32, 34 which are inserted in slot 28 with upper diverging surfaces facing upwardly. The bottom surfaces of the wedges are flat and slide on the top surface of a top plate 36 resting on the top of the coil 10 beneath the wedges.

To draw the wedges together and to achieve the desired longitudinal clamping action, the wedges are coaxially bored and one is tapped to receive a screw bolt 38.

From the foregoing, it will be clear that as the bolts 23, 23a are tightened the coil 10 is clamped laterally on each side by the leg. As the wedge bolts 38 are tightened, the wedges are drawn together and the wedge plate 36 is pressed down on the top of the coil while the bottom of the coil presses on the bottom plates 40. The coil is thereby clamped axially of the legs, parallel to the coil axis. Excessive pressure is avoided by the spacers 27 and 29 while the ultimate in rigidity and clamping is provided.

In Figs. 5, 6 and 7 another form of the invention is illustrated. In that form, the leg 114 is in general similar to the leg of Figs. 1-4 but differs in the following structural details: The recess in which the coil 10 is received is extended at slightly reduced width up to the top of the spacer-receiving slot 128 from which point the saw cut 126 extends on upward like the cut 26 of Figs. 1-3.

In the form of Figs. 5 and 6, the wedges 132 and 134 and wedge plate 136 and bolt 138 are similar to equivalent parts in Figs. 1-3. However the surfaces on which the wedges slide are combined with the spacer element in a block 150 located in the slot 128. The block is bored transversely relative to the leg to receive a tension bolt 123a which enables the bifurcations of the leg to be drawn together as close as permitted by the width of the block 150. This action is similar to that when the bolt 23a was tightened in Figs. 1-3.

Since the machining of the angled surfaces of the block 150 can be more accurately and economically done than the machining of the equivalent surfaces on the leg itself in Figs. 1-3, the form of Figs. 5-6 affords the increased accuracy together with increased economy.

At the lower end of the leg of Figs. 5, 6 and 7 a spacing block of I-shape is used to provide greater bearing surface for the bottom of the coil. The waist $129w$ of the I is placed in the space between the divided ends of the leg and the leg is clamped to embrace the coil by a bolt 123 as before. But, due to the lateral extensions $129e$ of the I block beyond and around the sides of the end portion of the leg, a larger bottom bearing plate 140 under the coil can be used than the similar plate 40 in Figs. 1-3.

In some types of vibration exciters where the requirements for rigidity of the driver coil assembly are not so severe as to demand a one-piece leg as described above but where more rigidity is required than in prior constructions, a leg formed of more than one piece may be used.

Figures 4, 9:
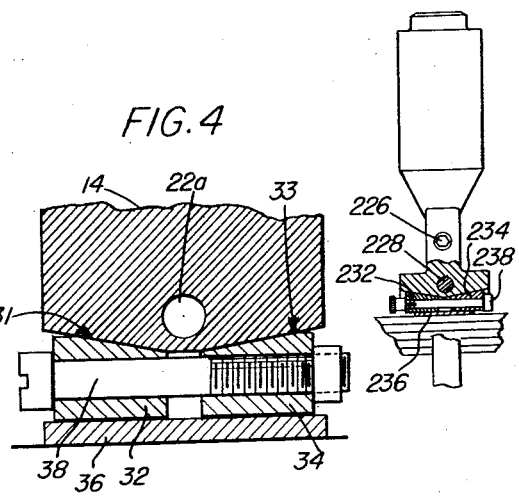
Fig. 4 is a fragmentary section view on a larger scale showing the connection of the leg with the top of the coil.
Fig. 9 is a fragmentary elevation view as viewed at a right angle to Fig. 8 of the leg, clamp and driver coil assembly of Fig. 8.

In Figs. 8 and 9, the leg is comprised of a generally cylindrical leg part 214 which is bored and tapped axially in its upper end for attachment to a table as in the previously described structures. The lower end of the leg part is flattened and transversely bored to receive a pair of parallel clamping tension bolts 227, 228.

Attached by said bolts to the flattened leg portion are the upper ends of two similar oppositely facing parallel clamping members 220, 224, having at their lower ends in-turned feet 221, 222 in abutting relation, thus providing between the clamping members a coil receiving spacer 225 for the driver coil 10. The flattened portion of the leg part 214 serves as a spacer to prevent too tight clamping of the coil when the clamp members are drawn together by tightening of tension bolts 226 and 228 which, as above stated, pass through the flattened portion 214 which also pass through and the clamps 220, 224 to clamp the legs to the coil. The lower end of the clamping members can be clamped together embracing the coil by a tension bolt 223 passing through a transverse bore in the foot of one clamp and threading into a registering tapped hole in the foot of the other clamp member.

To provide axial clamping action upon the coil, wedge members 232, 234, like wedges 32 and 34, are provided over the wedge or bearing plate 236 in position to be drawn together by a wedge bolt 238 as before. The upper inclined surfaces of the wedges slide over inclined diverging surfaces machined on the lower end of the flat portion 227 of the leg part. The flattened end of the leg part thus serves as a spacer and wedge-guide-track in a manner somewhat similar to the block 150 in the form of Figs. 5 and 6.

It should be understood that where I have spoken of horizontal and vertical positions or surfaces, those terms are merely relative, as the exciter can work equally well at many angles.

From the foregoing, it will be observed that the invention is particularly useful in exciters where the air gap is located near the top of the machine under the table and where the driver assembly does not extend through the body. It should be understood however that the means for obtaining rigidity which constitutes the invention can be used in other types of exciters if desired.

By the foregoing structure, the invention attains the ultimate in rigidity by the provision of both radial and axial clamping of the coil to the legs depending from the table of the vibration exciter. Where the maximum in rigidity is required, the one-piece leg will provide a structure to meet such maximum requirements.

Many modifications within the scope of the invention will occur to those skilled in the art. Therefore, I do not limit the invention to the specific forms and structure illustrated.

What is claimed is:

1. In a driver coil assembly for electromagnetic vibration exciters having a driver coil of substantial axial length and a table overlying one end of said coil, the connection between the coil and table comprising a leg portion rigidly attached to said table and a clamping portion joined to said leg portion, said clamping portion having cooperating members parallel to the coil axis and embracing said coil, wedging means carried by the connection and acting on one end of said coil, and means including a transverse bolt engaging said wedging means to move said wedging means laterally of said coil to exert clamping action on said coil parallel to the coil axis.

2. A driver coil assembly as claimed in claim 1 wherein the clamping portion and leg portion are a single piece.

3. A driver coil assembly as claimed in claim 2 wherein the leg portion has a diametric slot therein between said cooperating parallel members enabling said members to be spread at one end to permit insertion of the driver coil therebetween.

4. A driver coil assembly as claimed in claim 3 wherein the wedging means comprises two wedge members which said bolt draws together.

5. A driver coil assembly as claimed in claim 1 wherein the wedging means engages and slides over wedging surfaces between the top of the coil and said leg portion.

6. A driver coil assembly as claimed in claim 1 having a member between said parallel clamping members at the end thereof nearest the leg portion, said member acting to space said clamping members apart a predetermined amount and having inclined surfaces over which said wedging means slides.

7. A driver coil assembly as claimed in claim 1 wherein the clamping portion and leg portion are one piece, and there is a spacer member between the parallel clamping portions at their junction with the leg portion to limit movement of said clamping portions together to a predetermined amount, said spacer having an inclined surface thereon over which said wedging means slides.

8. A driver coil assembly as claimed in claim 7 wherein the leg portion has a diametric slot therein between said cooperating parallel members enabling said members to be spread at one end to permit insertion of the driver coil therebetween.

9. A driver coil assembly as claimed in claim 8 wherein the wedging means comprises two wedge members which said bolt can draw together.

10. A driver coil assembly as claimed in claim 1 wherein inclined surfaces are formed on the parallel clamping members at their junction with said leg portion over which inclined surfaces said wedging means slides.

11. A driver coil assembly as claimed in claim 10 wherein the clamping portion and leg portion are one piece.

12. A driver coil assembly as claimed in claim 11 wherein the leg portion has a diametric slot therein between said cooperating parallel members enabling said members to be spread at one end to permit insertion of the driver coil therebetween.

13. A driver coil assembly as claimed in claim 1 wherein the wedging means is located at the end of the coil nearest the leg portion, and a spacing member between the other ends of the parallel clamping members, and means to draw said other ends against said spacing member, said spacing member being extended beyond the sides of said other ends affording added bearing surface for the coil.

14. A driver coil assembly as claimed in claim 1 wherein the wedging means is located at the end of the coil nearest the leg portion, and a spacing member between the other ends of the parallel clamping members, and means to draw said other ends against said spacing member, said spacing member being extended beyond the sides of said other ends, and a bearing plate between said spacer and said coil covering the entire area of that face of said spacing member which is nearest the coil.

15. In a driver coil assembly for electromagnetic vibration exciters having a driver coil of substantial axial length and a table overlying one end of said coil, the connection between the coil and table comprising a leg portion rigidly attached to said table and a clamping portion, said clamping portion and said leg portion being one piece, said leg portion having a diametric slot above the coil between the cooperating parallel members enabling said members to be spread at one end for insertion of the driver coil therebetween, said clamping portion having cooperating members parallel to the coil axis and embracing the coil and having inturned feet underlying the coil, means to draw said parallel clamping members into lateral engagement with the sides of the coil, and means carried by said connection to exert clamping action on the coil parallel to the coil axis.

16. In a driver coil assembly for electromagnetic vibration exciters having a driver coil of substantial axial length and a table overlying one end of said coil, the connection between the coil and table comprising a leg portion rigidly attached to said table and a clamping portion, said clamping portion and said leg portion being one piece, said clamping portion having cooperating members parallel to the coil axis and embracing the coil and having inturned feet underlying the coil, means to draw said parallel clamping members into lateral engagement with the sides of the coil, and wedging means carried by the connection and acting on one end of the coil, and means to move said wedging means laterally of said coil to exert clamping action on said coil parallel to the coil axis.

17. A driver coil assembly as claimed in claim 16 wherein the wedging means comprises two wedges which are drawn towards each other and slide over inclined surfaces between the top of the coil and said leg portion.

18. A driver coil as claimed in claim 17 wherein the inclined surfaces are on a spacer block between said parallel clamping members, said block limiting the movement of said members toward each other.

References Cited in the file of this patent

UNITED STATES PATENTS

| | | |
|---|---|---|
| 1,568,871 | Brennan | Jan. 5, 1926 |
| 1,832,616 | Brown | Nov. 17, 1931 |
| 2,586,881 | Stirnkorb | Feb. 26, 1952 |

FOREIGN PATENTS

| | | |
|---|---|---|
| 120,113 | Austria | Dec. 10, 1930 |